United States Patent
Inomoto et al.

(10) Patent No.: US 10,329,974 B2
(45) Date of Patent: Jun. 25, 2019

(54) BREATHER CHAMBER STRUCTURE FOR INTERNAL COMBUSTION ENGINE

(71) Applicant: HONDA MOTOR CO., LTD., Tokyo (JP)

(72) Inventors: Yutaka Inomoto, Wako (JP); Koji Kobayashi, Wako (JP); Masazumi Naito, Wako (JP); Keita Shigematsu, Wako (JP); Ryuji Tsuchiya, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 45 days.

(21) Appl. No.: 15/265,542

(22) Filed: Sep. 14, 2016

(65) Prior Publication Data

US 2017/0089237 A1 Mar. 30, 2017

(30) Foreign Application Priority Data

Sep. 25, 2015 (JP) ................... 2015-187770

(51) Int. Cl.
*F01M 13/04* (2006.01)
*B62K 11/04* (2006.01)
*F02B 61/02* (2006.01)
*F01M 13/00* (2006.01)
*F02F 7/00* (2006.01)
*F02F 11/00* (2006.01)

(52) U.S. Cl.
CPC ............. *F01M 13/04* (2013.01); *B62K 11/04* (2013.01); *F02B 61/02* (2013.01); *F01M 2013/005* (2013.01); *F01M 2013/0461* (2013.01); *F01M 2013/0488* (2013.01); *F02F 7/0007* (2013.01); *F02F 11/00* (2013.01); *F02F 2007/0063* (2013.01)

(58) Field of Classification Search
CPC ................... F01M 13/04; F01M 13/00; F01M 2013/0038; F01M 2013/0461
See application file for complete search history.

(56) References Cited

U.S. PATENT DOCUMENTS 4,825,818 A 5/1989 Hamamura et al.
6,425,451 B2 * 7/2002 Yoshida ................. F01M 13/04
123/572

(Continued)

FOREIGN PATENT DOCUMENTS

JP 59-79511 U 5/1984
JP 4-365915 A 12/1992

(Continued)

*Primary Examiner* — Long T Tran
(74) *Attorney, Agent, or Firm* — Birch, Stewart, Kolasch & Birch, LLP

(57) ABSTRACT

A breather chamber structure for an internal combustion engine wherein the breather chamber can be disposed compactly and the degree of freedom in the layout of the parts of the internal combustion engine can be raised. The breather chamber structure includes a crankcase, a cylinder body provided upwardly on the crankcase, and a breather chamber configured to separate oil from oil mist in the crankcase. The breather chamber includes a crankcase side breather chamber provided in the crankcase and open to a joining plane between the crankcase and the cylinder body, and a cylinder side breather chamber provided in the cylinder body and open to the joining plane.

14 Claims, 11 Drawing Sheets

(56) References Cited

U.S. PATENT DOCUMENTS

| | | | |
|---|---|---|---|
| 6,662,791 B2* | 12/2003 | Nakamizo | F01M 13/0011 123/572 |
| 6,834,643 B2* | 12/2004 | Hori | F01M 13/022 123/572 |
| 2001/0050193 A1 | 12/2001 | Yoshida et al. | |
| 2002/0104504 A1* | 8/2002 | Suzuki | F02B 61/02 123/195 R |
| 2003/0150438 A1* | 8/2003 | Nakamizo | F01M 13/0011 123/572 |
| 2004/0149242 A1* | 8/2004 | Hori | F01M 13/00 123/41.86 |
| 2007/0075521 A1* | 4/2007 | Ogasawara | B62J 25/00 280/291 |
| 2007/0095335 A1* | 5/2007 | Matsuda | F01M 13/021 123/572 |
| 2015/0114368 A1* | 4/2015 | Kurita | F01M 13/04 123/573 |

FOREIGN PATENT DOCUMENTS

| | | |
|---|---|---|
| JP | 5-118210 A | 5/1993 |
| JP | 5-77523 U | 10/1993 |
| JP | 06-264759 A | 9/1994 |
| JP | 2001-233275 A | 8/2001 |
| JP | 2007120480 A | 5/2007 |
| JP | 2008196351 A | 8/2008 |
| JP | 2014-77364 A | 5/2014 |

* cited by examiner

This application claims priority under 35 USC 119 to Japanese Patent Application No. 2015-187770 filed Sep. 25, 2015 the entire contents of which are hereby incorporated by reference.

BREATHER CHAMBER STRUCTURE FOR INTERNAL COMBUSTION ENGINE

CROSS-REFERENCE TO RELATED APPLICATIONS

The present application claims priority under 35 USC 119 to Japanese Patent Application No. 2015-187770 filed Sep. 25, 2015 the entire contents of which are hereby incorporated by reference.

BACKGROUND OF THE INVENTION

1. Field of the Invention

The present invention relates to a breather chamber structure for an internal combustion engine.

2. Description of Background Art

A structure of an internal combustion engine incorporated in a vehicle is disclosed, for example, in Japanese Patent Laid-Open No. Hei 6-264759 (see, FIGS. 1 and 2) wherein a breather chamber for separating oil mist in a crankcase into liquid and gas is disposed on an upper face of the crankcase in the rear of a cylinder body.

However, if a breather chamber is disposed on an upper face of a crankcase as in the internal combustion engine disclosed in Japanese Patent Laid-Open No. Hei 6-264759 (FIGS. 1 and 2), then the breather chamber projects upwardly from the crankcase in order to assure the volume of the breather chamber. Therefore, it is necessary to dispose other parts of the internal combustion engine so as to avoid the breather chamber. Further, since also a breather hose connected to the breather chamber projects, restrictions occur with respect to the disposition of parts around the same.

SUMMARY AND OBJECTS OF THE INVENTION

Taking such prior art as described above into consideration, it is an object of an embodiment of the present invention to provide a breather chamber structure for an internal combustion engine wherein the breather chamber can be disposed compactly and the degree of freedom in the layout of the parts in the internal combustion engine can be increased.

In order to solve the object described above, according to an embodiment of the present invention, there is provided a breather chamber structure for an internal combustion engine, including a crankcase, a cylinder body provided upwardly on the crankcase, and a breather chamber for separating oil from oil mist in the crankcase, the breather chamber including a crankcase side breather chamber provided in the crankcase and open to a joining plane between the crankcase and the cylinder body, and a cylinder side breather chamber provided in the cylinder body and open to the joining plane.

According to an embodiment of the present invention, the breather chamber structure for the internal combustion engine is configured such that it further includes a cylinder head disposed upwardly on the cylinder body, and a cylinder head communicating path formed in the cylinder head in a communicating relationship with the cylinder side breather chamber.

According to an embodiment of the present invention, the breather chamber structure for the internal combustion engine is configured such that a breather opening portion for communicating with an air cleaner through communication with the cylinder head communicating path is disposed in the cylinder head.

According to an embodiment of the present invention, the breather chamber structure for the internal combustion engine is configured such that a breather entrance opening which communicates with the inside of the crankcase is provided in a breather chamber bottom wall of the crankcase side breather chamber and a gasket for partitioning the crankcase side breather chamber and the cylinder side breather chamber from each other is disposed on the joining plane while a gasket communicating port for communicating the crankcase side breather chamber and the cylinder side breather chamber with each other is formed in the gasket.

According to an embodiment of the present invention, the breather chamber structure for the internal combustion engine is configured such that the internal combustion engine is an internal combustion engine incorporated in a vehicle with a crankshaft disposed in a vehicle widthwise direction, wherein an exit opening of an oil return path extending from the crankcase side breather chamber is formed on a side face of the crankcase, wherein the exit opening is disposed between the crankshaft and a main shaft of a transmission, and that the oil return path is disposed so as to extend obliquely rearwardly outwards from the crankcase side breather chamber as viewed in top plan.

According to an embodiment of the present invention, the breather chamber structure for the internal combustion engine is configured such that an alternating current (AC) generator is provided at an end portion of the crankshaft on the same side as that of the exit opening in the vehicle widthwise direction, and a vehicle widthwise direction inner end portion of the AC generator is disposed on the outer side in the vehicle widthwise direction with respect to a boss portion around the exit opening as viewed in top plan.

According to an embodiment of the present invention, the breather chamber structure for the internal combustion engine is configured such that the crankcase has a transmission chamber for accommodating the transmission therein, and the breather chamber bottom wall is formed so as to partition the transmission chamber and the crankcase side breather chamber from each other wherein a lowest portion of the exit opening of the oil return path is positioned lower than the breather chamber bottom wall.

According to an embodiment of the present invention, wherein the internal combustion engine includes a plurality of cylinders, and the breather opening portion is disposed between a plurality of intake ports formed in the cylinder head.

According to an embodiment of the present invention, since the breather chamber is formed so as to span the crankcase and the cylinder body, the crankcase side breather chamber can be disposed compactly on the upper face side of the crankcase, and the degree of freedom in the layout of the breather chamber and the layout of the parts relating to the internal combustion engine can be increased.

Further, since the breather chamber is configured in the crankcase and the cylinder body which are principal parts, the number of parts for configuring the breather chamber can be reduced.

According to an embodiment of the present invention, the cylinder head communicating path is provided in the cylinder head in communicating with the cylinder side breather chamber. Consequently, the breather chamber can be disposed compactly and the gas-liquid separation performance can be enhanced while the capacity is assured.

According to an embodiment of the present invention, the breather opening portion is disposed so as to be positioned above the crankcase. Consequently, a degree of freedom in disposition of other parts on the upper face of the crankcase is assured.

According to an embodiment of the present invention, the gasket communicating port is formed in the gasket. Consequently, oil mist moves from the crankcase side breather chamber to the cylinder side breather chamber through the gasket communicating port. Therefore, the gas-liquid separation performance is improved in the moving process of the oil mist.

According to an embodiment of the present invention, the exit opening is disposed such that oil in oil mist separated in the breather chamber drops to a location between the crankshaft and the main shaft on a side face of the crankcase. Therefore, dropping oil does not flow down to the crankshaft or the main shaft, and this is less likely to provide friction to them.

Further, since the exit opening is disposed obliquely behind the oil return path as viewed in a top plan view, upon accelerating the movement of the vehicle, discharge of oil is promoted and the oil can be dropped efficiently.

According to an embodiment of the present invention, the boss portion is disposed around the exit opening on the inner side with respect to the inner end portion of the AC generator in the vehicle widthwise direction. Therefore, even when oil is dropped, the oil is less likely to hit upon the rotating AC generator, and generation of friction is avoided.

According to an embodiment of the present invention, oil separated from oil mist and flowing down to the breather chamber bottom wall flows to the exit opening of the oil return path positioned lower than the breather chamber bottom wall without staying there. Therefore, rapid oil reflux can be promoted.

According to an embodiment of the present invention, the breather opening portion can be disposed in the proximity of the air cleaner connecting to the intake port while the dead space between the plurality of intake ports of the cylinder head is utilized effectively. Therefore, the distance of the breather hose which connects the breather opening portion and the air cleaner to each other can be reduced.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

In the following, a breather chamber structure for an internal combustion engine according to an embodiment of the present invention is described with reference to FIGS. 1 to 11.

Figure 1:
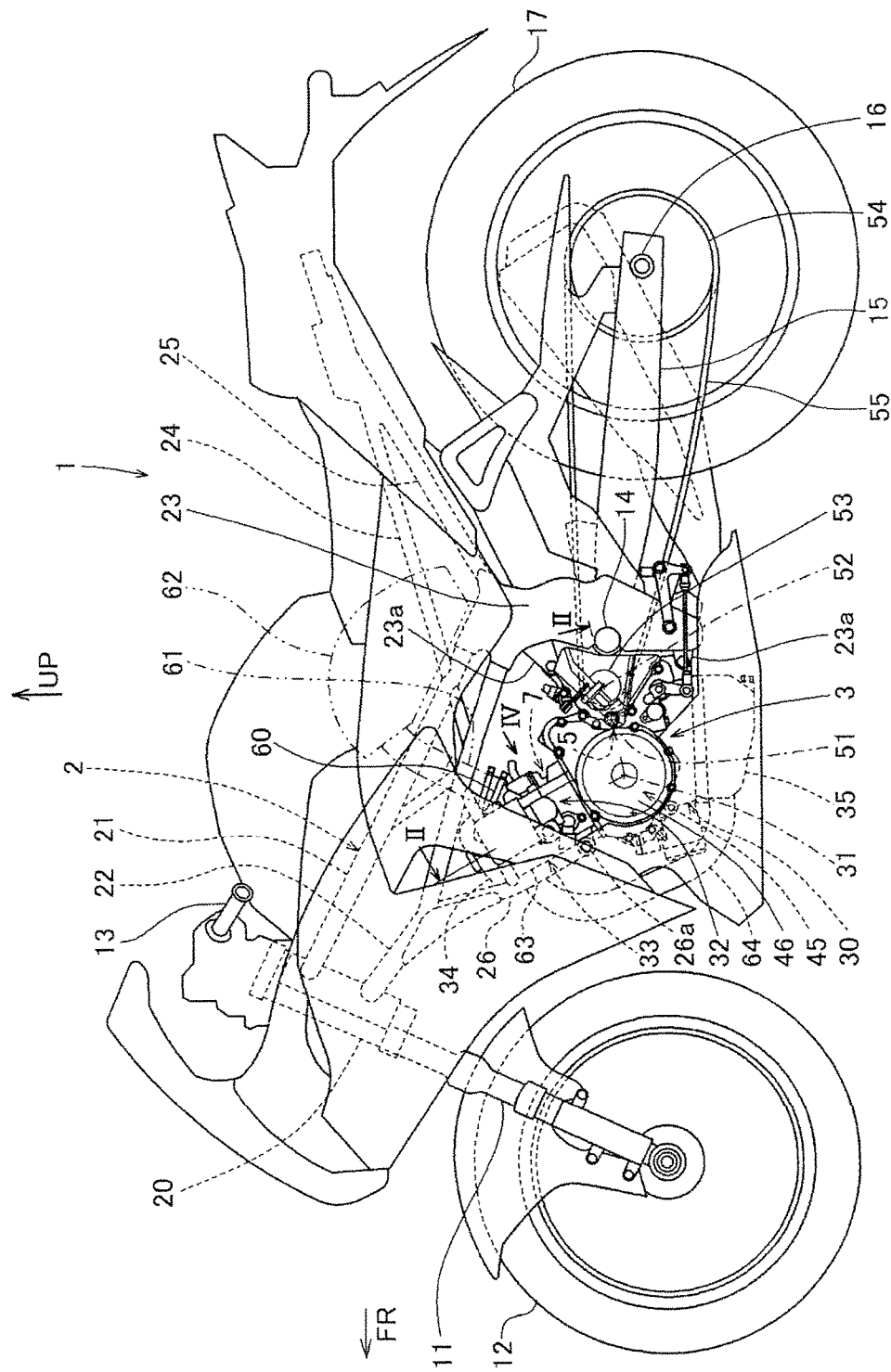
FIG. 1 is a left side elevational view of a motorcycle in which an internal combustion engine including a breather chamber structure according to an embodiment of the present invention is incorporated.

FIG. 1 is a left side elevational view of a saddle type vehicle which is a vehicle in which an internal combustion engine including the breather chamber structure according to the embodiment of the present invention is incorporated. More particularly, the vehicle may be a motorcycle 1.

In the present invention, the forward, rearward, leftward and rightward directions coincide with those of an ordinary reference in which the advancing direction of the motorcycle 1 according to the present embodiment is the forward direction. Further, in the figures, an arrow mark UP indicates the upward direction; an arrow mark FR indicates the forward direction; an arrow mark LH indicates the leftward direction; and an arrow mark RH indicates the rightward direction.

It is to be noted that a small dark arrow mark additionally indicated in the figures schematically indicates a flow of blow-by gas in the present invention according to the present embodiment. Further, a blank small arrow mark schematically indicates a flow of oil separated from oil mist of blow-by gas.

As depicted in FIG. 1, a vehicle body frame 2 of the motorcycle 1 includes a pair of left and right upper side main frames 21 and a pair of left and right lower side main frames 22 extending obliquely rearwardly downwardly from a head pipe 20. The upper side main frames 21 and the lower side main frames 22 are coupled at a rear end thereof to a center frame 23.

Further, a seat rail 24 extends obliquely rearwardly upwardly from a rear portion of the upper side main frames 21 and the lower side main frames 22, and the seat rail 24 and the center frame 23 are connected to each other by an auxiliary frame 25.

A down frame 26 is branched and extends obliquely downwardly rearwardly from a front portion of the lower side main frames 22.

A front fork 11 is supported for steering movement on the head pipe 20 and extends downwardly. A front wheel 12 is supported for rotation at a lower end of the front fork 11.

A steering handlebar 13 is coupled integrally to an upper end of the front fork 11.

An internal combustion engine 3 incorporated in the motorcycle 1 in the present embodiment is a water-cooled two-cylinder four-stroke cycle internal combustion engine and is supported and suspended on a support bracket 23a provided on the center frame 23 of the vehicle body frame 2 and a lower end 26a of the down frame 26.

The internal combustion engine 3 is mounted transversely on the vehicle body frame 2 such that a crankshaft 31 is supported for rotation on a crankcase 30 and is directed in a vehicle widthwise direction, namely, in a leftward and rightward widthwise direction of the vehicle body.

Figure 2:
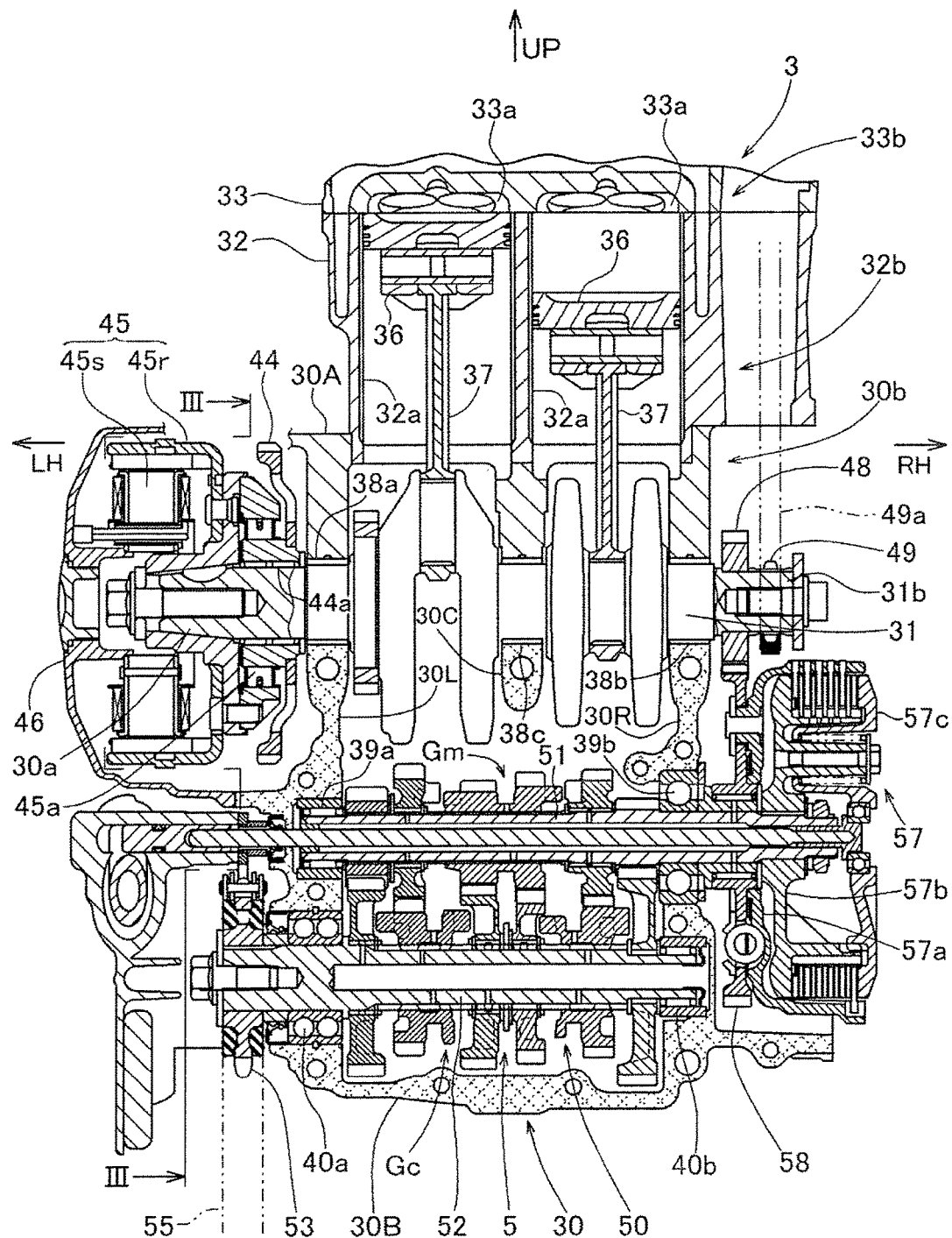
FIG. 2 is a sectional developed view of the internal combustion engine taken along line II-II of FIG. 1.

The crankcase 30 of the internal combustion engine 3 of the present embodiment is structured so as to configure a so called a power unit in which a transmission 5 is accommodated in the rear of the crankshaft 31. Further, as depicted in FIG. 2 which is a sectional developed view of the internal combustion engine 3 taken along line II-II of FIG. 1, the transmission 5 includes a transmission gear group configured from a driving gear group Gm and a driven gear group Gc which mesh with each other. The driving gear group Gm and the driven gear group Gc are supported for rotation on a main shaft 51 and a countershaft 52, respectively, and the countershaft 52 serves as an output power shaft. A driving chain sprocket 53 is fitted at an end portion which extends to the outside through a left side wall 31L of the crankcase 30 of the countershaft 52.

A swing arm 15 is supported at a front end thereof on the center frame 23 of the vehicle body frame 2 by a pivot shaft 14 and extends rearwardly for an upwardly and downwardly rocking motion. A rear wheel 17 is supported for rotation at a rear end of the swing arm 15 by a rear axle 16.

An endless driving chain 55 is suspended between a driven chain sprocket 54 fitted on the rear axle 16 and the driving chain sprocket 53 (refer to FIG. 1).

Figure 3:
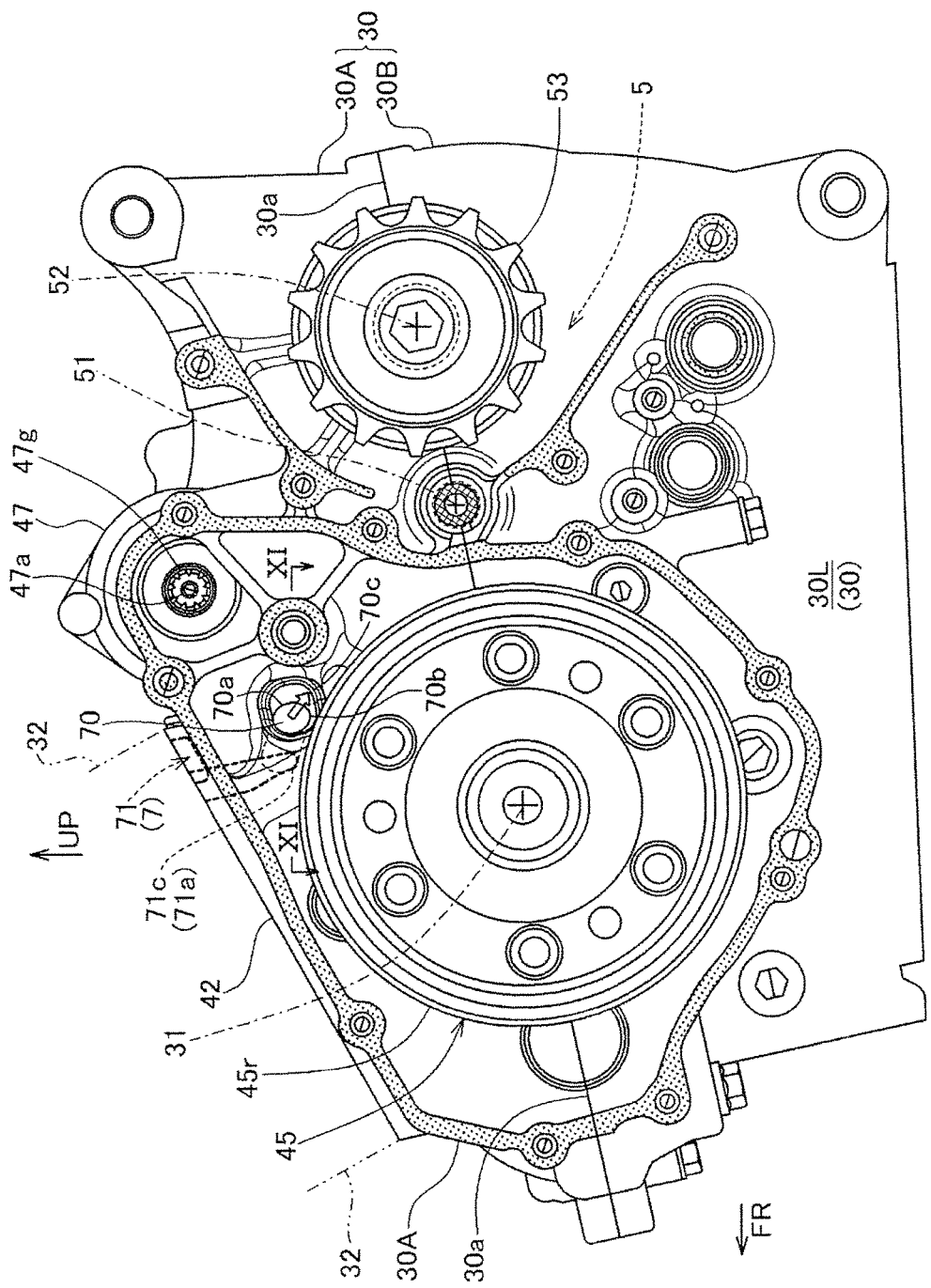
FIG. 3 is a left side elevational view of a crankcase of the internal combustion engine taken along line III-III of FIG. 2.

FIG. 3 is a left side elevational view of the crankcase 30 of the internal combustion engine 3 taken along line III-III of FIG. 2. Also an AC generator 45 attached to the crankshaft 31, a starter motor 47 attached to an upper face of the crankcase 30 and the driving chain sprocket 53 attached to the countershaft 52 are depicted in FIG. 3.

The crankcase 30 is formed by integrally fastening an upper crankcase half 30A and a lower crankcase half 30B as two upper and lower split parts. The crankshaft 31 and the main shaft 51 and the countershaft 52 of the transmission 5 are arrayed in parallel in order from above in a parting plane 30a between the upper crankcase half 30A and the lower crankcase half 30B.

An oil return path 70 extends from a breather chamber 7 hereinafter described and has an exit opening 70a at a left side face of the crankcase 30. The exit opening 70a is disposed so as to be positioned above a location between the crankshaft 31 and the main shaft 51 of the transmission 5 as viewed in side elevation.

As depicted in FIG. 2, a cylinder body 32 is placed in a forwardly inclined state at an upper portion of the upper crankcase half 30A, and a cylinder head 33 is placed on and integrally fastened to the cylinder body 32. The cylinder body 32 has two cylinder bores 32a arrayed in series in the leftward and rightward direction thereon.

A head cover 34 is placed on the cylinder head 33, and an oil pan 35 is attached to a lower portion of the lower crankcase half 30B (refer to FIG. 1).

A piston 36 is fitted for back and forth sliding movement in each of the two cylinder bores 32a of the cylinder body 32. A combustion chamber 33a is formed in a corresponding relationship to each of the cylinder bores 32a in the cylinder head 33 placed at an upper portion of the cylinder body 32.

The piston 36 is connected to the crankshaft 31 through a connecting rod 37.

Referring to FIG. 1, two intake ports 60 are open to a rear portion of the cylinder head 33 in a corresponding relationship to the cylinder bores 32a and are connected to an intake system such as a throttle body 61, an air cleaner 62 and so forth. Meanwhile, two exhaust ports 63 are open to a front end portion of the cylinder head 33 in a corresponding relationship to the cylinder bores 32a and are connected to exhaust pipes 64.

Referring to FIG. 3, the starter motor 47 is disposed adjacent a root portion of the cylinder body 32, which projects upwardly in a forwardly inclined relationship from the upper crankcase half 30A, in the rear of a root portion of the cylinder body 32.

As depicted in FIG. 2, the crankshaft 31 is supported for rotation on left and right side walls 30L and 30R of the crankcase 30, which oppose to each other, and an intermediate central wall 30C between the left and right side walls 30L and 30R through left, right and central bearings 38a, 38b and 38c, respectively. The main shaft 51 and the countershaft 52 of the transmission 5 in the rear of the crankshaft 31 are supported for rotation on the left and right side walls 30L and 30R of the crankcase 30 though left and right bearings 39a and 39b and left and right bearings 40a and 40b, respectively.

It is to be noted that the left side wall 30L of the crankcase 30 is formed by joining the left side wall of the upper crankcase half 30A and the left side wall of the lower crankcase half 30B together along a parting plane 30a. Similarly, also the right side wall 30R of the crankcase 30 is formed by joining the right side wall of the upper crankcase half 30A and the right side wall of the lower crankcase half 30B together along the parting plane 30a.

The crankshaft 31 and the main shaft 51 and countershaft 52 of the transmission 5 are supported by the left, right and central bearings 38a, 38b and 38c, left and right bearings 39a and 39b and left and right bearings 40a and 40b in order from the front side along the parting plane 30a between the upper crankcase half 30A and the lower crankcase half 30B.

The crankshaft 31 extends through the left bearing 38a and projects at a left end portion 31a to the left outer side ("one end portion" in the present invention) thereof from the left side wall 30L of the crankcase 30, and a starting driven gear 44 and the AC generator 45 are provided successively on the crankshaft 31.

An alternating current generator (ACG) cover 46 covers the AC generator 45 from the left side.

The starting driven gear 44 is supported for rotation on the crankshaft 31 through a bearing 44a and is connected to an outer rotor 45r of the AC generator 45 fitted on the crankshaft 31 through a one-way clutch 45a.

The starting driven gear 44 receives driving power of the starter motor 47 transmitted thereto through an intermediate gear not depicted interposed between the starting driven gear 44 and a driving gear 47g formed on a drive shaft 47a of the starter motor 47.

An inner stator 45s is disposed on the inner side of the outer rotor 45r of the AC generator 45 and is fixed to and supported on the ACG cover 46.

Meanwhile, the crankshaft 31 extends through the right bearing 28b and projects at a right end portion 31b thereof from the right side wall 30R of the crankcase 30 to the right outer side, and has a primary driving gear 48 and a cam chain driving sprocket 49 fitted thereon successively.

A timing chain 49a extends between the cam chain driving sprocket 49 and a cam chain driven sprocket not depicted fitted on a camshaft 66 (refer to FIG. 5) of a valve system 65 through the inside of cam chain chambers 30b, 32b and 33b provided on the right side of the crankcase 30, cylinder body 32 and cylinder head 33, respectively. Consequently, the valve system 65 is driven in synchronism with rotation of the crankshaft 31.

The transmission 5 for changing the speed of the driving force of the internal combustion engine 3 to that of a predetermined shift stage is a normally constant mesh type transmission, in which the driving gear group Gm from the first to sixth speeds supported for rotation on the main shaft 51 and the driven gear group Gc from the first to sixth stages supported for rotation on the countershaft 52 mesh with each other for the individual shift stages and gear changeover between speeds is performed by a transmission mechanism not depicted.

The main shaft 51 projects at a right side portion thereof in the right direction from the right side wall 30R of the crankcase 30, and a transmission clutch 57 of the multi-plate friction type is provided at the right side portion of the main shaft 51.

A clutch outer 57a of the transmission clutch 57 is supported on a primary driven gear 58, which is supported for rotation on the main shaft 51, through a buffer member. A clutch inner 57b is fitted integrally on the main shaft 51, and a plurality of clutch plates are interposed between the clutch outer 57a and the clutch inner 57b such that they are engaged with or disengaged from each other by driving of a compression member 57c.

The primary driven gear 58 is configured to be held in meshing engagement with the primary driving gear 48 fitted on the crankshaft 31 such that rotational power of the crankshaft 31 is transmitted to the transmission clutch 57 through the primary driving gear 48 on the crankshaft 31 side and the primary driven gear 58 on the transmission clutch 57 side. However, during changeover of the transmission 5, the transmission clutch 57 does not transmit rotational power of the crankshaft 31 to the transmission 5, and after the gear changeover of the transmission 5 comes to an end, the transmission clutch 57 transmits rotational power of the crankshaft 31 to the main shaft 51 of the transmission 5.

It is to be noted that, as described hereinabove, a left end portion of the countershaft 52 extends through the left side wall 30L of the crankcase 30 and projects to the outer side leftward such that it serves as a final output power shaft 52 of the internal combustion engine 3.

Figure 4:
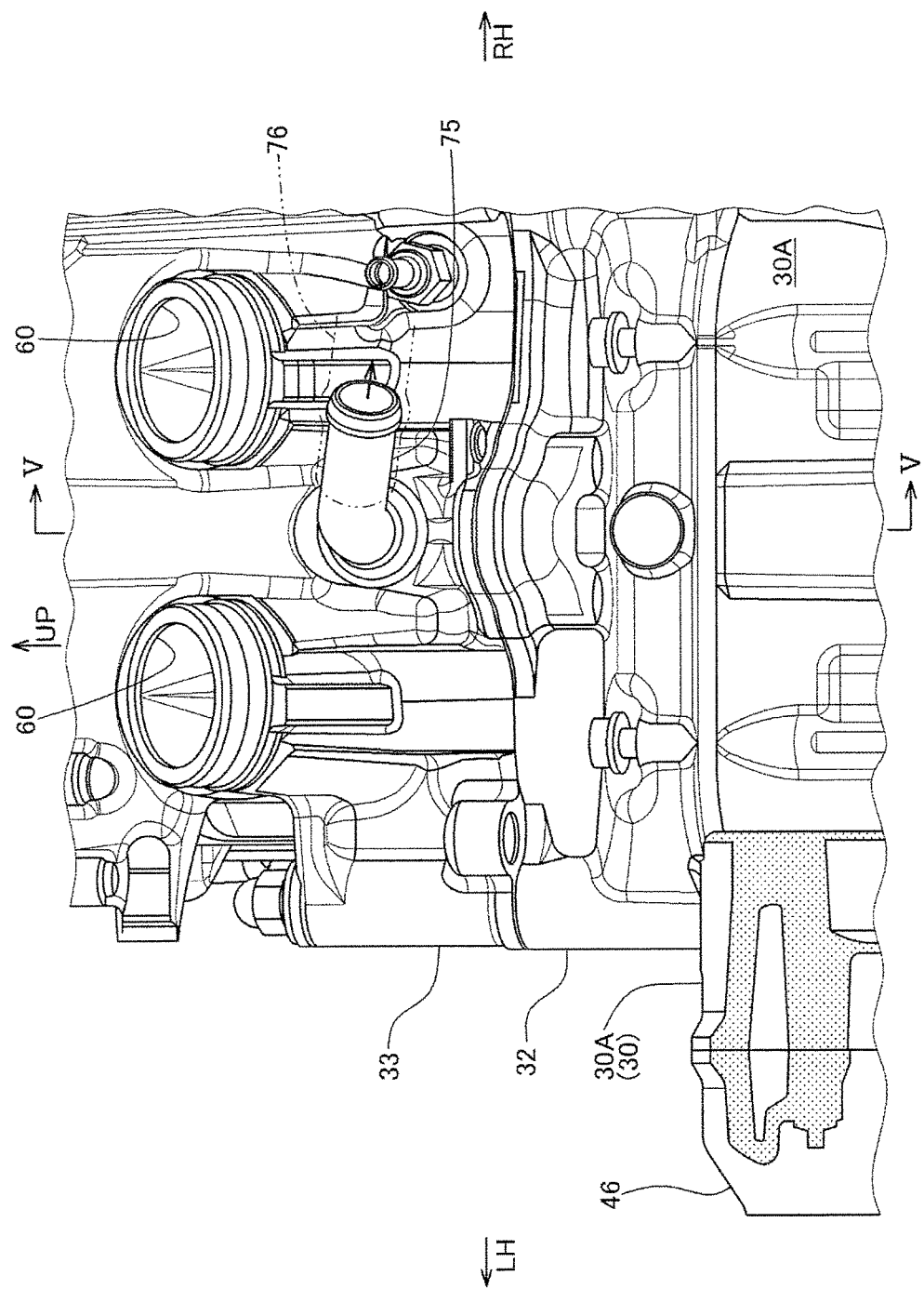
FIG. 4 is a rear elevational view of a cylinder body and a cylinder head of the internal combustion engine as viewed in a direction indicated by an arrow mark IV in FIG. 1.

FIG. 4 is a rear elevational view of the cylinder body 32 and the cylinder head 33 of the internal combustion engine 3 taken along a direction indicated by an arrow mark IV of FIG. 1. FIG. 4 depicts that, at a rear portion of the cylinder head 33, an entrance portion of the two intake ports 60 and a breather opening portion 75 of the breather chamber 7 hereinafter described are provided such that the breather opening portion 75 is positioned between the entrance portions of the intake ports 60.

Figure 5:
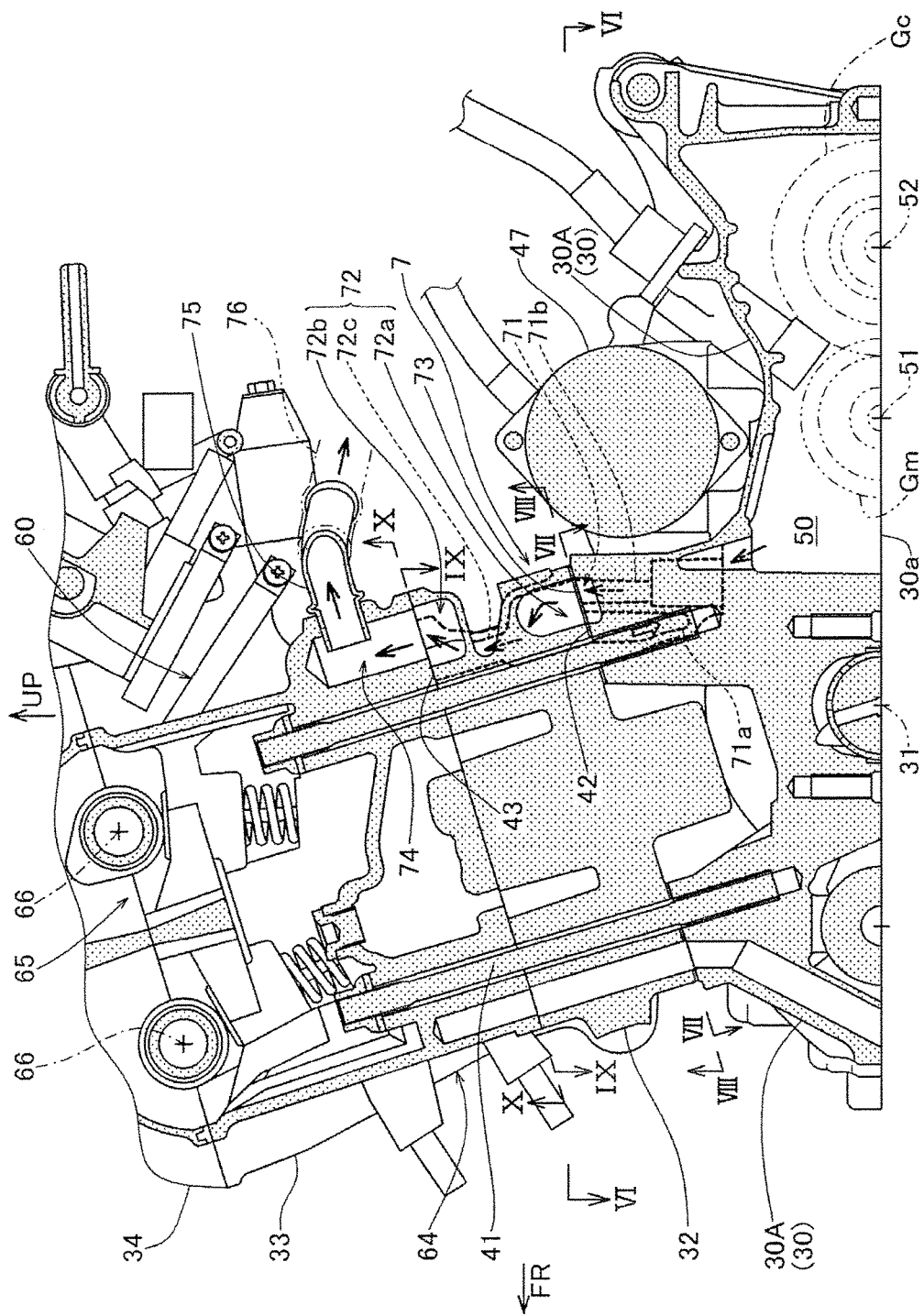
FIG. 5 is a left side elevational sectional view of the internal combustion engine taken along line V-V of FIG. 4.

FIG. 5 is a left side elevational sectional view of the internal combustion engine 3 taken along line V-V of FIG. 4.

As depicted in FIG. 5, the cylinder body 32 is provided on the upper crankcase half 30A of the crankcase 30, and the cylinder head 33 is disposed on the cylinder body 32. The cylinder body 32 and the cylinder head 33 are fastened together by stud bolts 41 such that they are provided uprightly in a rather forwardly inclined state on the upper crankcase half 30A.

The head cover 34 is provided on the cylinder head 33 such that it covers the valve system 65 provided on the cylinder head 33.

In the internal combustion engine 3 of the present embodiment, the breather chamber 7 is provided such that it separates oil from oil mist of blow-by gas in the crankcase 30.

The breather chamber 7 includes a crankcase side breather chamber 71 provided on an upper face of the upper crankcase half 30A of the crankcase 30 and a cylinder side breather chamber 72 provided in the cylinder body 32.

The breather chamber 7 is formed so as to span the crankcase 30 and the cylinder body 32 such that the crankcase side breather chamber 71 is open to a joining plane 42 between the upper crankcase half 30A of the crankcase 30 and the cylinder body 32 and also the cylinder side breather chamber 72 is open to the joining plane 42 so as to confront the crankcase side breather chamber 71. Therefore, the crankcase side breather chamber 71 can be disposed compactly on the upper face side of the crankcase 30, and this increases the degree of freedom of the layout of the breather chamber 7 and the layout of the parts relating to the internal combustion engine 3.

Further, since the breather chamber 7 is configured in the main parts including the crankcase 30 and the cylinder body 32, the number of parts configuring the breather chamber 7 is reduced.

The crankcase 30 has a transmission chamber 50 for accommodating the transmission 5 therein, and a breather chamber bottom wall 71a of the crankcase side breather chamber 71 is formed so as to partition the transmission chamber 50 and the crankcase side breather chamber 71 from each other. However, the crankcase side breather chamber 71 has a breather entrance opening 71b provided therein so as to communicate with the transmission chamber 50, namely, with the inside of the crankcase 30.

Further, a bottom wall deepest portion 71c is formed on the left end side of the breather chamber bottom wall 71a so as to be deep toward the inner side of the crankcase 30, and is in communication with the oil return path 70 hereinafter described (see, FIGS. 3, 6 and 11).

It is to be noted that a gasket 73 is sandwiched along the joining plane 42 between the upper crankcase half 30A of the crankcase 30 and the cylinder body 32. The gasket 73 is formed and disposed such that it partitions the crankcase side breather chamber 71 and the cylinder side breather chamber 72 from each other. The gasket 73 has a gasket communicating port 73a formed therein such that it communicates with the crankcase side breather chamber 71 and the cylinder side breather chamber 72.

Therefore, oil mist of blow-by gas moves from the crankcase side breather chamber 71 into the cylinder side breather chamber 72 through the gasket communicating port 73a, and therefore, the gas-liquid separation performance of oil mist of blow-by gas in the process of the movement of the oil mist is enhanced.

The cylinder side breather chamber 72 is formed from a lower chamber 72a open to the joining plane 42 between the crankcase 30 and the cylinder body 32 and confronting the crankcase side breather chamber 71, an upper chamber 72b open to an upper joining plane 43 between the cylinder body 32 and the cylinder head 33, and a vertical communicating hole 72c connecting the lower chamber 72a and the upper chamber 72b to each other.

A cylinder head communicating path 74 is formed on the cylinder head 33 side such that it is open to the upper joining plane 43 so as to confront the upper chamber 72b of the cylinder side breather chamber 72, communicates with the upper chamber 72b of the cylinder side breather chamber 72 and configures an extension of the breather chamber 7. The breather opening portion 75 is disposed at a rear portion of the cylinder head 33 in a communicating relationship with the cylinder head communicating path 74.

The breather opening portion 75 is in communication with the air cleaner 62 in the rear through the breather hose 76 mounted thereon such that blow-by gas in the breather chamber 7 is fed into the air cleaner 62, in which it used for re-combustion together with intake air.

Accordingly, since the breather chamber 7 is in communication with the cylinder side breather chamber 72 and the cylinder head communicating path 74 is provided in the cylinder head 33, the breather chamber 7 can be disposed compactly while the a large volume is substantially assured for the breather chamber 7 by the cylinder head communicating path 74. In addition, the gas-liquid separation performance of oil mist in the blow-by gas can be enhanced by the moving process of blow-by gas from the cylinder side breather chamber 72 to the cylinder head communicating path 74.

Further, since the breather opening portion 75 is provided on the cylinder head 33 on the cylinder body 32 and is disposed so as to be positioned above the crankcase 30 as depicted in FIG. 5, a degree of freedom in the disposition of other parts such as the starter motor 47 and so forth on the upper face of the crankcase 30 is assured.

Figure 6:
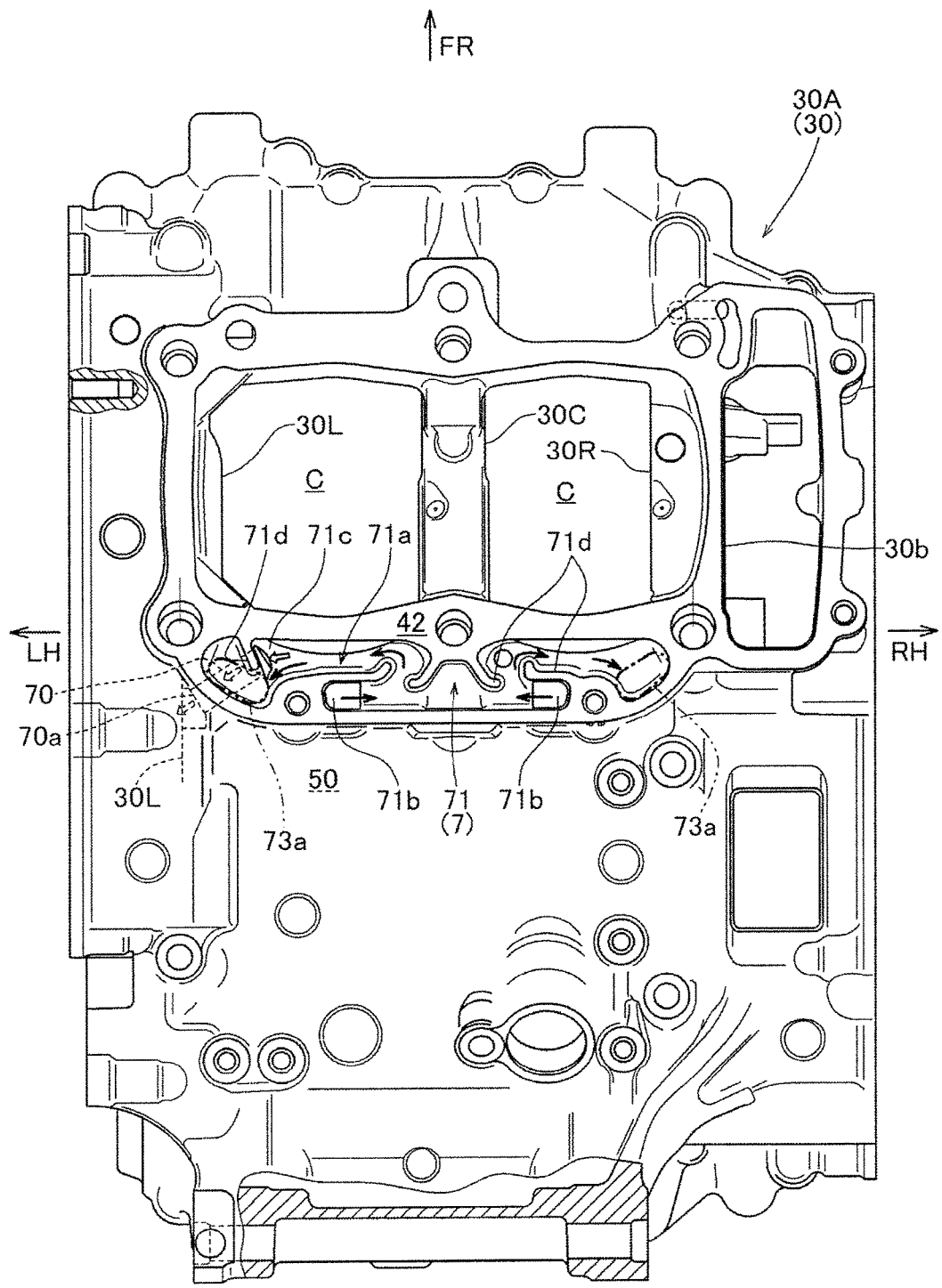
FIG. 6 is a top plan view of an upper crankcase half of the crankcase taken along line VI-VI of FIG. 5.

FIG. 6 is a top plan view of the upper crankcase half 30A of the crankcase 30 taken along line VI-VI of FIG. 5. While the joining plane 42 between the crankcase 30 and the cylinder body 32 is projected in a rather forwardly inclined state in FIG. 6. As depicted in FIG. 6, the crankcase side breather chamber 71 is formed in the rear of the cylinder position C at which the two cylinders are disposed so as to be horizontally long over the leftward and rightward width at the cylinder position C at which the two cylinders are juxtaposed, and is open to the joining plane 42.

Two breather entrance openings 71b are provided at positions in the rear of the cylinder positions C at each of which two cylinders are disposed and are open toward the transmission chamber 50 below, namely, toward the inside of the crankcase 30.

In the gasket 73 sandwiched along the joining plane 42, two gasket communicating ports 73a are provided so as to be positioned on the left and right end sides of the crankcase side breather chamber 71 as indicated by alternate long and two short dashed lines in FIG. 6. Consequently, blow-by gas passing the breather entrance openings 71b and flowing in from the inside of the crankcase 30 moves along a labyrinth-like flow path, which is formed by rib portions 71d provided in a projecting manner in the crankcase side breather chamber 71, to the gasket communicating port 73a while bypassing the rib portions 71d. Then, oil mist of the blow-by gas moves into the cylinder side breather chamber 72 through the gasket communicating ports 73a. Therefore, the gas-liquid separation performance is raised in the moving process of the oil mist.

On the other hand, the breather chamber bottom wall 71a of the crankcase side breather chamber 71 is formed deep toward the left, and the bottom wall deepest portion 71c is provided along the rib portions 71d on the left end side (see, FIG. 3).

The oil return path 70 is provided in the left side wall 30L of the crankcase 30 and is open on one side portion thereof to and in communication with the bottom wall deepest portion 71c. Meanwhile, the oil return path 70 is disposed on the other end side thereof so as to extend obliquely rearwardly outwards and downwardly from the communicating portion thereof (see, FIG. 3). The oil return path 70 is open at the end portion thereof as the exit opening 70a to the left side wall 30L.

More particularly, a lowest portion 70b (refer to FIG. 3) of the exit opening 70a of the oil return path 70 is positioned lower than the bottom wall deepest portion 71c of the breather chamber bottom wall 71a.

Therefore, oil separated from oil mist flows along the breather chamber bottom wall 71a to the bottom wall deepest portion 71c and flows into the oil return path 70. Then, the oil flows out to the inner side (right side) of the AC generator 45 (refer to FIG. 2) and flows into the crankcase 30 through an oil path not depicted and then flows back into the oil pan 35.

Accordingly, oil separated from oil mist and flowing down to the breather chamber bottom wall 71a flows without staying there to the exit opening 70a of the oil return path 70 positioned lower than the breather chamber bottom wall 71a. Therefore, rapid oil refluxing can be promoted.

Figure 7:
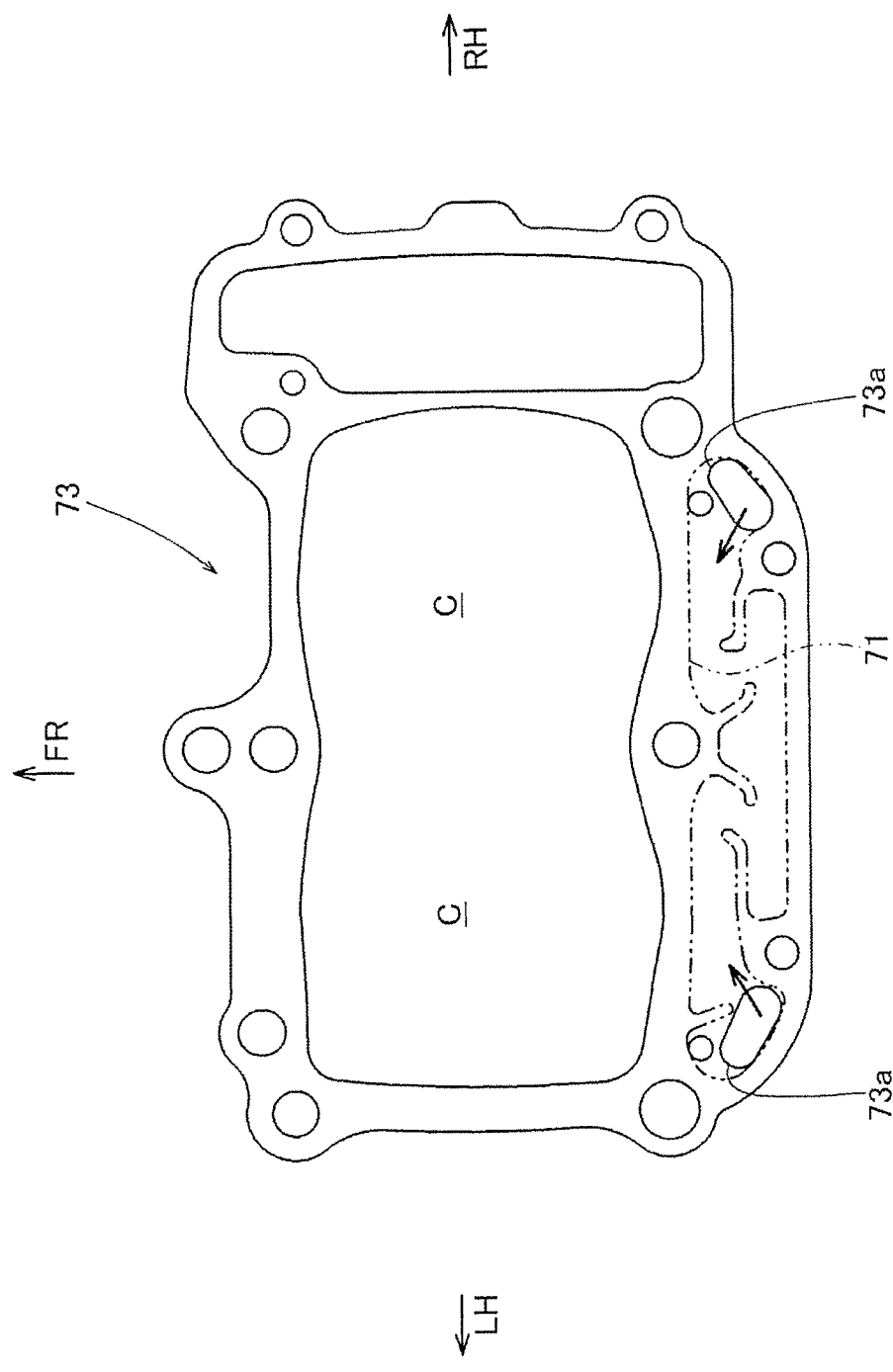
FIG. 7 is a top plan view of a gasket taken along line VII-VII of FIG. 5.

FIG. 7 is a top plan view of the gasket 73 taken along line VII-VII of FIG. 5.

The gasket 73 partitions the crankcase side breather chamber 71 and the cylinder side breather chamber 72 from each other and is positioned so as to cover the crankcase side breather chamber 71 positioned therebelow as indicated by alternate long and two short dashed lines. The gasket 73 is communicated with the cylinder side breather chamber 72 positioned thereabove only through the gasket communicating ports 73a at the two locations.

Figure 8:
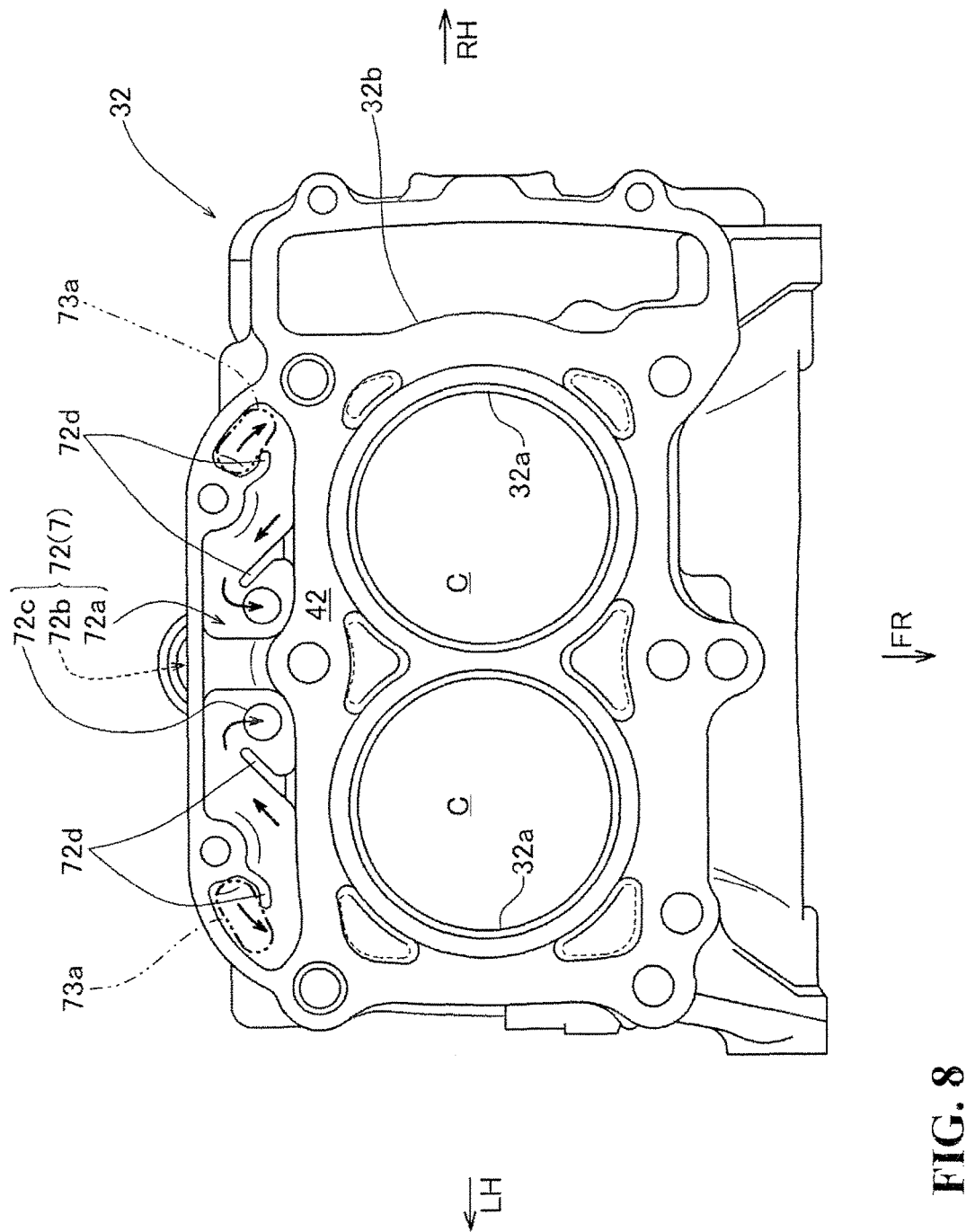
FIG. 8 is a bottom plan view of a cylinder body taken along line VIII-VIII of FIG. 5, wherein the lower side is the front side of the motorcycle.

FIG. 8 is a bottom plan view of the cylinder body 32 taken along line VIII-VIII of FIG. 5, and in FIG. 8, the lower side is the front side of the motorcycle.

The gasket communicating ports 73a at the two locations of the gasket 73 indicated by alternate long and two short dashed lines are positioned on the left and right end sides of the lower chamber 72a of the cylinder side breather chamber 72. Further, the vertical communicating holes 72c at the two locations of the cylinder side breather chamber 72 are positioned rather near to the center in the leftward and rightward direction.

Blow-by gas flowing from the gasket communicating ports 73a into the lower chambers 72a of the cylinder side breather chamber 72 moves along the labyrinth like flow path formed by the rib portions 72d provided in a projecting manner in the lower chambers 72a while bypassing the rib portions 72d until it comes to the vertical communicating holes 72c, and oil mist of the blow-by gas moves into the upper chamber 72b through the vertical communicating holes 72c. Therefore, the gas-liquid separation performance of oil mist of blow-by gas in the process of the movement of the oil mist is enhanced.

The oil separated from the blow-by gas flows back through the vertical communicating holes 72c and the gasket communicating ports 73a and comes to the breather chamber bottom wall 71a of the crankcase side breather chamber 71, and then passes the bottom wall deepest portion 71c and is discharged through the exit opening 70a of the oil return path 70 until it is refluxed into the oil pan 35.

Figure 9:
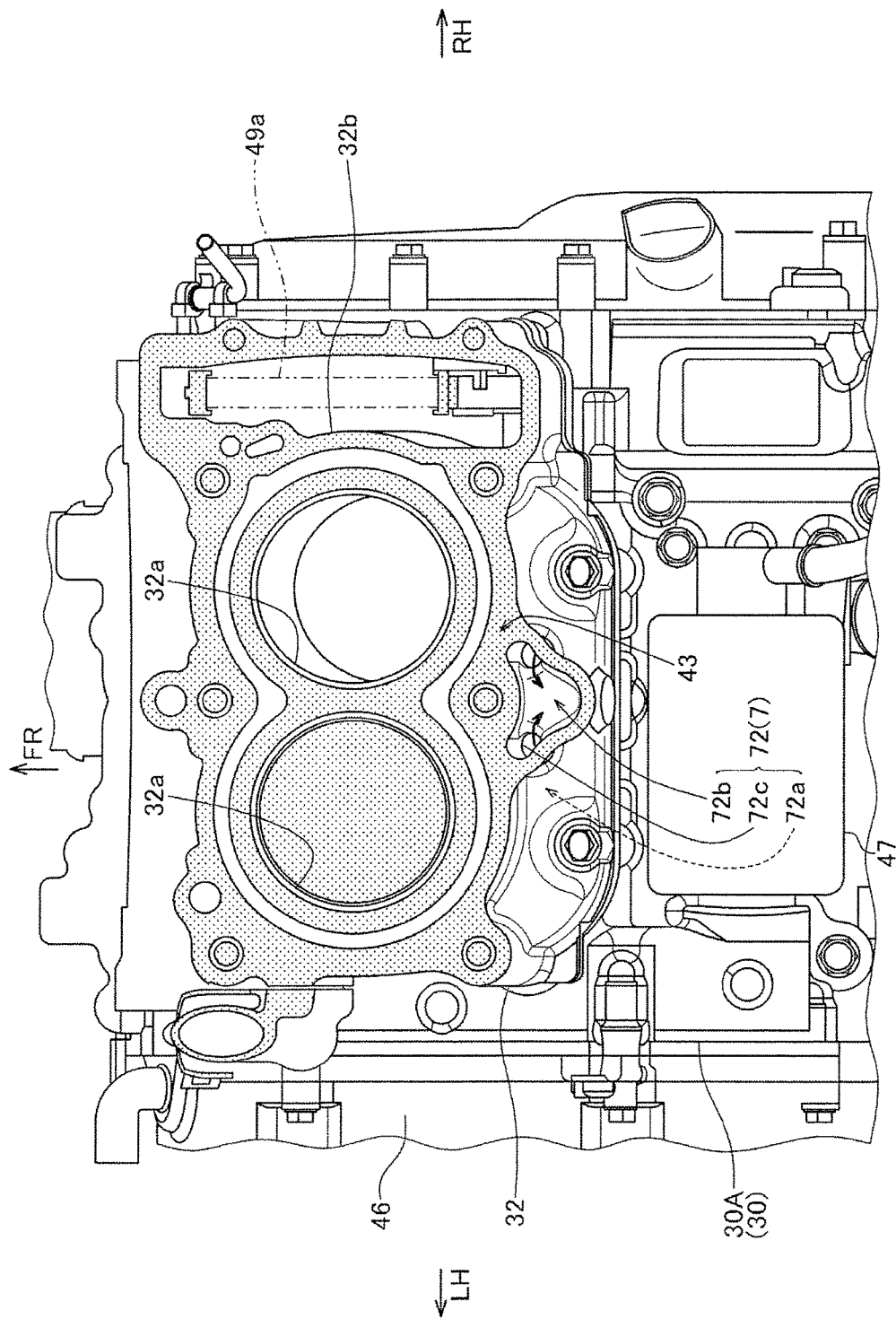
FIG. 9 is a top plan view of the cylinder body taken along line IX-IX of FIG. 5.

FIG. 9 is a top plan view of the cylinder body 32 taken along line IX-IX of FIG. 5.

The two vertical communicating holes 72c rather near to the center in the left ward direction and right ward direction join together in the upper chamber 72b of the cylinder side breather chamber 72, and the upper chamber 72b forms an opening substantially coincident with the cylinder head communicating path 74 confronting the upper chamber 72b at the upper joining plane 43.

It is to be noted that, as depicted in FIGS. 4 and 5, the breather opening portion 75 is attached to the cylinder head 33, and a special protruding portion toward the upper face of the crankcase 30 is not formed at a rear portion of the cylinder body 32. Therefore, the degree of freedom in the disposition of parts relating to the internal combustion engine 3 such as the starter motor 47 on the upper face of the crankcase 30 is enhanced.

Figure 10:
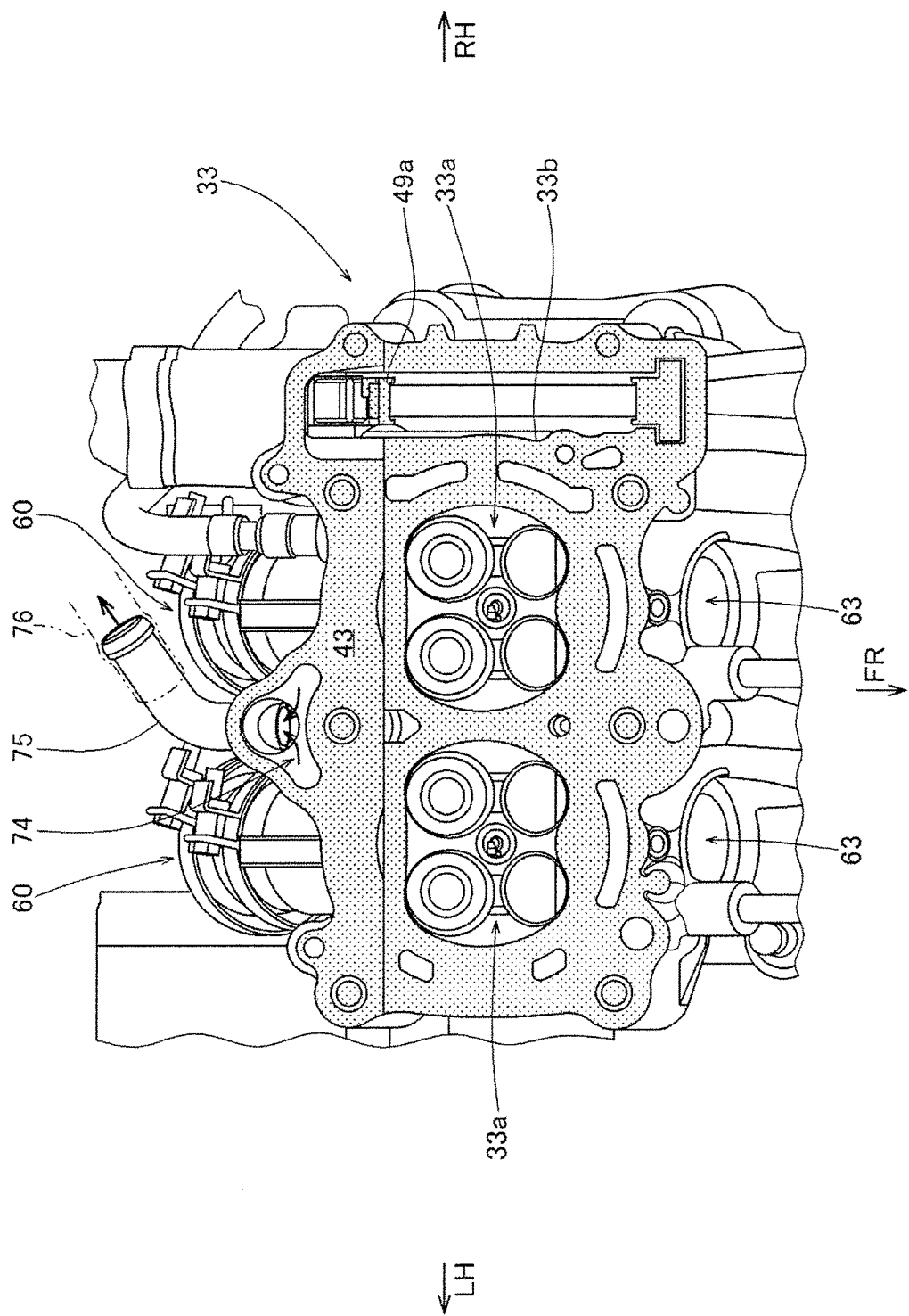
FIG. 10 is a bottom plan view of the cylinder head taken along line X-X of FIG. 5, wherein the lower side is the front side of the motorcycle.

FIG. 10 is a bottom plan view of the cylinder head 33 taken along line X-X of FIG. 5, and in FIG. 10, the lower side is the front side of the motorcycle.

On the upper joining plane 43 between the cylinder body 32 and the cylinder head 33, the cylinder head communicating path 74 of the cylinder head 33 forms an opening at a substantially same position with that and of a same shape as that of the upper chamber 72b of the cylinder side breather chamber 72 confronting the same.

Accordingly, the breather opening portion 75 for communicating with the air cleaner 62 (see, FIG. 1) through communication with the cylinder head communicating path 74 is positioned centrally in the leftward and rightward direction of the cylinder head 33 and is disposed at a position intermediately between the two intake ports 60 (see, FIG. 4).

In this manner, in the present embodiment, since the breather opening portion 75 can be disposed in the proximity of the air cleaner 62 connecting to the intake ports 60 while the dead space between the two intake ports 60 of the cylinder head 33 is effectively utilized, the distance of the breather hose 76 which connects the breather opening portion 75 and the air cleaner 62 to each other can be made short.

Figure 11:
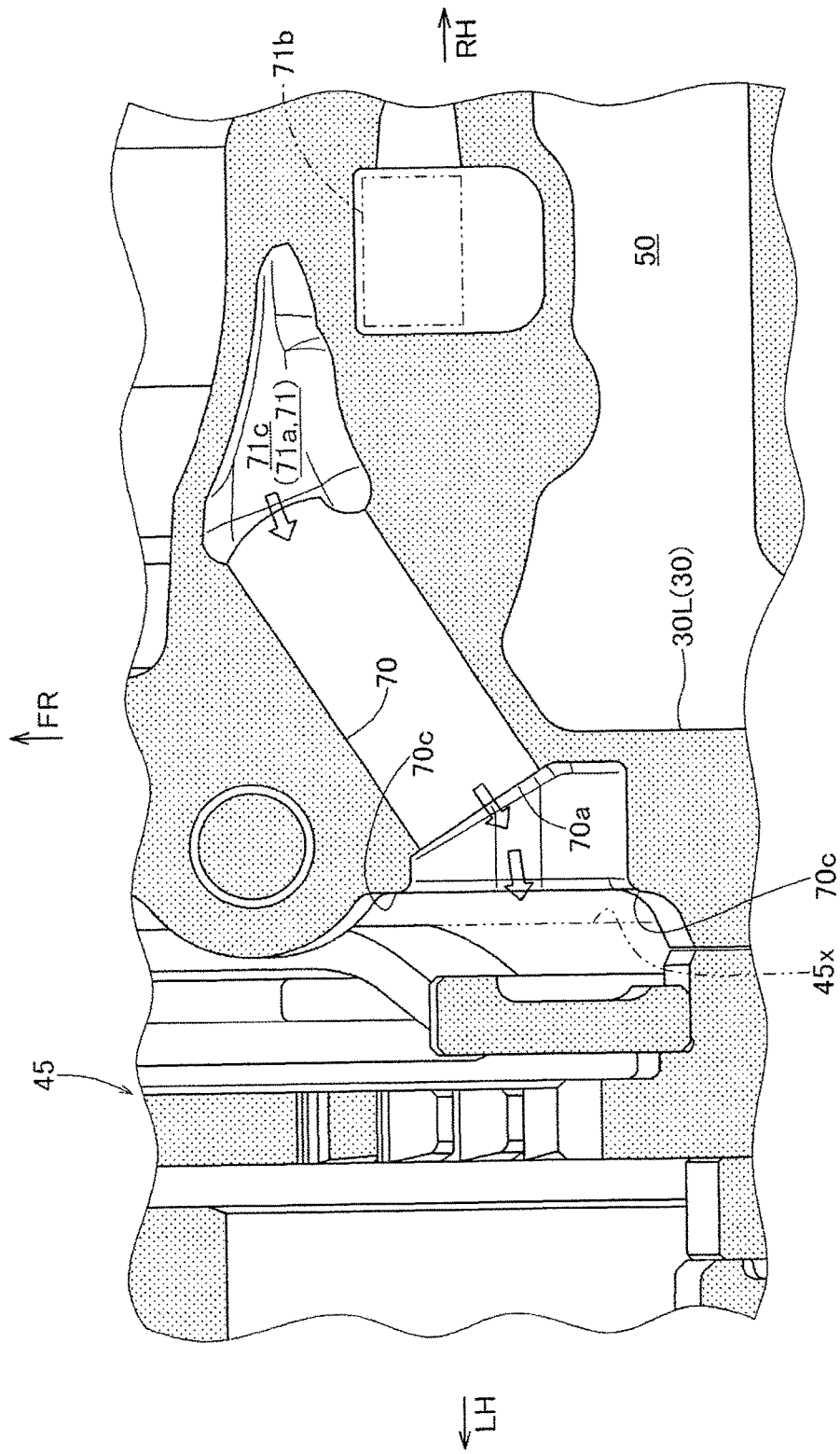
FIG. 11 is a partially elevational sectional plan view of the upper crankcase half taken along line XI-XI of FIG. 3.

FIG. 11 is a partially elevational sectional plan view of the upper crankcase half 30A taken along line XI-XI of FIG. 3. In particular, FIG. 11 depicts a cross section of the oil return path 70 which is provided in the upper crankcase half 30A of the crankcase 30 and has an end portion open to and in communication with the bottom wall deepest portion 71c of the breather chamber bottom wall 71a of the crankcase side breather chamber 71.

The other end side of the oil return path 70 is disposed such that it extends obliquely rearwardly outwards from the bottom wall deepest portion 71c of the breather chamber bottom wall 71a of the crankcase side breather chamber 71 as viewed in a top plan view as depicted also in FIG. 6, and is open to a side face of the left side wall 30L of the crankcase 30 to form the exit opening 70a.

Since the exit opening 70a is disposed at an oblique rear position of the oil return path 70 as viewed in a top plan view, the discharge of oil upon accelerating the movement of the motorcycle 1 is promoted. Consequently, oil can be discharged and dropped efficiently, and rapid oil reflux can be promoted.

Furthermore, as depicted in FIG. 3, the lowest portion 70b of the exit opening 70a of the oil return path 70 is positioned lower than the bottom wall deepest portion 71c of the breather chamber bottom wall 71a. Therefore, oil separated from oil mist of blow-by gas and flowing down to the breather chamber bottom wall 71a flows to the exit opening 70a of the oil return path 70 positioned lower than the bottom wall deepest portion 71c of the breather chamber bottom wall 71a without staying in the oil return path 70, and consequently, rapid oil reflux can be promoted.

Further, as depicted in FIG. 3, the exit opening 70a is disposed so as to be positioned above a location between the crankshaft 31 and the main shaft 51 of the transmission 5 as viewed in a side elevation. Therefore, oil in oil mist of blow-by gas separated in the breather chamber 7 drops to the location between the crankshaft 31 and the main shaft 51 sidewardly of the crankcase 30, and consequently, the dropping oil does not flow down to the crankshaft 31 or the main shaft 51 and is less likely to produce friction of the parts.

Further, the AC generator 45 is provided at the left end portion 31a of the crankshaft 31 on the same side as the exit opening 70a in the vehicle widthwise direction. Although the AC generator 45 is positioned leftwardly of the left side wall 30L of the crankcase 30, in the present embodiment, a vehicle widthwise direction inner end portion 45x of the AC generator 45 is disposed on the outer side in the vehicle widthwise direction as viewed in a top plan view with respect to a boss portion 70c formed on the left side wall 30L of the crankcase 30 around the exit opening 70a of the oil return path 70 as depicted in FIG. 11.

Since the boss portion 70c around the exit opening 70a is disposed on the inner side with respect to the vehicle widthwise direction inner end portion 45x of the AC generator 45 in this manner, even if oil from the exit opening 70a flows down along the boss portion 70c, oil is less likely to hit upon the rotating AC generator 45, and the generation of friction is avoided.

Although the breather chamber structure for an internal combustion engine according to an embodiment of the present invention has been described, the mode of the present invention is not limited to the embodiment described-above but the present invention is carried out various modes without departing from the spirit and scope of the claims of the present invention.

For example, the "vehicle" is not limited to a motorcycle indicated by the embodiment but may be any of various vehicles such as three-wheeled or four-wheeled vehicles and so forth if they are vehicles which incorporate an internal combustion engine.

Further, the internal combustion engine is not limited to that of the two cylinder type as in the embodiment, and the "plurality of cylinders" may include three or more cylinders.

It is to be noted that, although, in the description of the embodiment, the left-right disposition of the components of the internal combustion engine is described specifically for the convenience of description, the components of the internal combustion engine may be disposed in the leftward and rightward reverse relationship.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A breather chamber structure for an internal combustion engine, comprising:
   a crankcase;
   a cylinder body provided upwardly on the crankcase;
   a breather chamber configured to separate oil from oil mist in the crankcase;
   the breather chamber includes:
      a crankcase side breather chamber provided in the crankcase and open to a joining plane between the crankcase and the cylinder body, and
      a cylinder side breather chamber provided in the cylinder body and open to the joining plane;
   said breather chamber spans the crankcase and the cylinder body for compactly forming the breather chamber on an upper face side of the crankcase;

a transmission chamber configured to accommodate a transmission therein, said transmission being positioned in the crankcase and includes a main shaft having a plurality of gears connected thereto, said main shaft being operatively connected to a crankshaft positioned in the crankcase;

wherein a breather chamber bottom wall partitions the transmission chamber and the crankcase side breather chamber from each other with a lowest portion of an exit opening of an oil return path being positioned lower than the breather chamber bottom wall, wherein oil is separated from oil mist and flows along the breather chamber bottom wall to the oil return path;

a breather entrance opening, which communicates with the inside of the crankcase, is provided in the breather chamber bottom wall of the crankcase side breather chamber; and a gasket for partitioning the crankcase side breather chamber and the cylinder side breather chamber from each other is disposed between a top surface of the crankcase and a bottom surface of the cylinder body while a gasket communicating port for communicating the crankcase side breather chamber and the cylinder side breather chamber with each other is formed in the gasket.

2. The breather chamber structure for the internal combustion engine according to claim 1, and further comprising:
a cylinder head disposed upwardly on the cylinder body; and
a cylinder head communicating path formed in the cylinder head in a communicating relationship with the cylinder side breather chamber.

3. The breather chamber structure for the internal combustion engine according to claim 2, wherein a breather opening portion, for communicating with an air cleaner through communication with the cylinder head communicating path, is disposed in the cylinder head.

4. The breather chamber structure for the internal combustion engine according to claim 1, wherein a breather opening portion, for communicating with an air cleaner through communication with a cylinder head communicating path, is disposed in the cylinder head.

5. The breather chamber structure for the internal combustion engine according to claim 4, wherein the internal combustion engine includes a plurality of cylinders, and the breather opening portion is disposed between a plurality of intake ports formed in the cylinder head.

6. The breather chamber structure for the internal combustion engine according to claim 1, wherein the internal combustion engine is an internal combustion engine incorporated in a vehicle with the crankshaft disposed in a vehicle widthwise direction;
an exit opening of the oil return path extending from the crankcase side breather chamber is formed on a side face of the crankcase;
the exit opening is disposed between the crankshaft and the main shaft of the transmission; and
the oil return path is disposed so as to extend obliquely rearwardly outwards from the crankcase side breather chamber as viewed in a top plan view.

7. The breather chamber structure for the internal combustion engine according to claim 6, wherein an alternating current generator is provided at an end portion of the crankshaft on the same side as that of the exit opening in the vehicle widthwise direction; and
a vehicle widthwise direction inner end portion of the alternating current generator is disposed on the outer side in the vehicle widthwise direction with respect to a boss portion around the exit opening as viewed in top plan.

8. The breather chamber structure for the internal combustion engine according to claim 6, wherein the internal combustion engine includes a plurality of cylinders, and the breather opening portion is disposed between a plurality of intake ports formed in the cylinder head.

9. The breather chamber structure for the internal combustion engine according to claim 1, wherein the internal combustion engine includes a plurality of cylinders, and the breather opening portion is disposed between a plurality of intake ports formed in the cylinder head.

10. A breather chamber structure for an internal combustion engine, comprising:
a crankcase;
a cylinder body operatively mounted on an upper portion of the crankcase;
a breather chamber configured to separate oil from oil mist in the crankcase, said breather chamber comprising:
a crankcase side breather chamber formed in the crankcase and having an opening to a joining plane between the crankcase and the cylinder body, and
a cylinder side breather chamber formed in the cylinder body and having an opening to the joining plane;
said breather chamber spans the crankcase and the cylinder body for compactly forming the breather chamber on an upper face side of the crankcase;
a transmission chamber configured to accommodate a transmission therein, said transmission being positioned in the crankcase and includes a main shaft having a plurality of gears connected thereto, said main shaft being operatively connected to a crankshaft positioned in the crankcase;
wherein a breather chamber bottom wall partitions the transmission chamber and the crankcase side breather chamber from each other with a lowest portion of an exit opening of an oil return path being positioned lower than the breather chamber bottom wall, wherein oil is separated from oil mist and flows along the breather chamber bottom wall to the oil return path;
a breather entrance opening, which communicates with the inside of the crankcase, is provided in the breather chamber bottom wall of the crankcase side breather chamber; and
a gasket for partitioning the crankcase side breather chamber and the cylinder side breather chamber from each other is disposed between a top surface of the crankcase and a bottom surface of the cylinder body while a gasket communicating port for communicating the crankcase side breather chamber and the cylinder side breather chamber with each other is formed in the gasket.

11. The breather chamber structure for the internal combustion engine according to claim 10, and further comprising:
a cylinder head disposed on an upper portion on the cylinder body; and
a cylinder head communicating path formed in the cylinder head in a communicating relationship with the cylinder side breather chamber.

12. The breather chamber structure for the internal combustion engine according to claim 10, wherein a breather opening portion, for communicating with an air cleaner through communication with a cylinder head communicating path, is disposed in the cylinder head.

13. The breather chamber structure for the internal combustion engine according to claim 10, wherein the internal combustion engine is an internal combustion engine incorporated in a vehicle with the crankshaft disposed in a vehicle widthwise direction;

an exit opening of the oil return path extending from the crankcase side breather chamber is formed on a side face of the crankcase;

the exit opening is disposed between the crankshaft and the main shaft of the transmission; and the oil return path is disposed so as to extend obliquely rearwardly outwards from the crankcase side breather chamber as viewed in a top plan view.

14. The breather chamber structure for the internal combustion engine according to claim 13, wherein an alternating current generator is provided at an end portion of the crankshaft on the same side as that of the exit opening in the vehicle widthwise direction; and a vehicle widthwise direction inner end portion of the alternating current generator is disposed on the outer side in the vehicle widthwise direction with respect to a boss portion around the exit opening as viewed in top plan.

\* \* \* \* \*